(12) United States Patent
Klement et al.

(10) Patent No.: US 7,889,223 B2
(45) Date of Patent: Feb. 15, 2011

(54) PRINT ALIGNMENT FOR BI-DIRECTIONALLY SCANNING ELECTROPHOTOGRAPHIC DEVICE

(75) Inventors: Martin C. Klement, Lexington, KY (US); Daniel R. Klemer, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 1042 days.

(21) Appl. No.: 11/506,424

(22) Filed: Aug. 18, 2006

(65) Prior Publication Data

US 2008/0043261 A1 Feb. 21, 2008

(51) Int. Cl.
*B41J 2/435* (2006.01)

(52) U.S. Cl. ...................................... 347/248
(58) Field of Classification Search .......... 358/1.1–1.16
See application file for complete search history.

(56) References Cited

U.S. PATENT DOCUMENTS 5,250,956 A * 10/1993 Haselby et al. ............... 347/19
6,089,766 A * 7/2000 Yamada et al. .......... 400/120.09
6,196,736 B1 * 3/2001 Otsuki et al. ........... 400/124.01
6,390,587 B1 * 5/2002 Subirada ....................... 347/19
6,398,334 B2 * 6/2002 Dunand ....................... 347/14
2004/0125198 A1 7/2004 Klement

* cited by examiner

*Primary Examiner*—Benny Q Tieu
*Assistant Examiner*—Michael Tzeng

(57) ABSTRACT

Methods and apparatus include aligning printing of a bi-directionally scanning electrophotographic (EP) device, such as a laser printer or copy machine. At least first and second scan lines formed in opposite directions define a calibration page for manufacturing, servicing or end-user operating. The page includes pluralities of diagnostic patterns repeatedly tiled together in various formats. In one instance, a first pattern defines a substantially rectangular cell of pixels (pels) for at least a first and second scan line of opposite directions. A second pattern defines the first pattern except at least one of the pels of either the first and second scan lines is intentionally displaced at least one pel width in the scan direction. Upon repeatedly tiling groups of either the first or second patterns together, multiple bars of the calibration page are formed. A darkest of the bars represents a preferred calibration setting of the EP device.

19 Claims, 16 Drawing Sheets

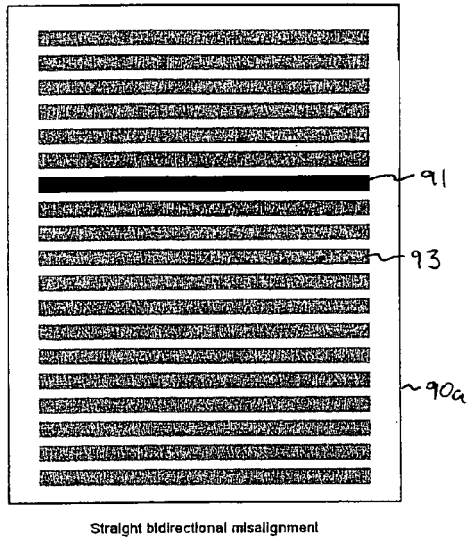
Straight bidirectional misalignment
FIG. 9A
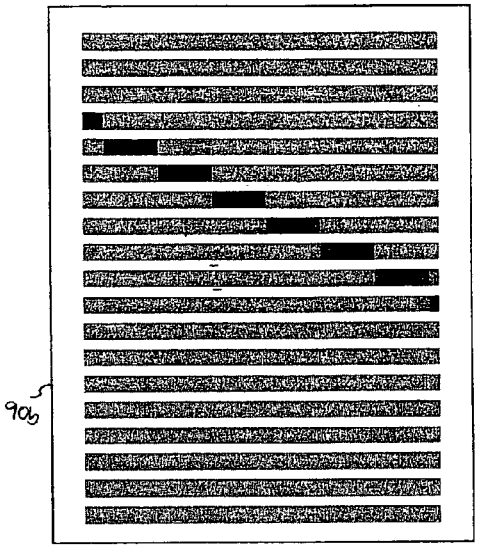
Line length mismatch
FIG. 9B
FIG. 9D
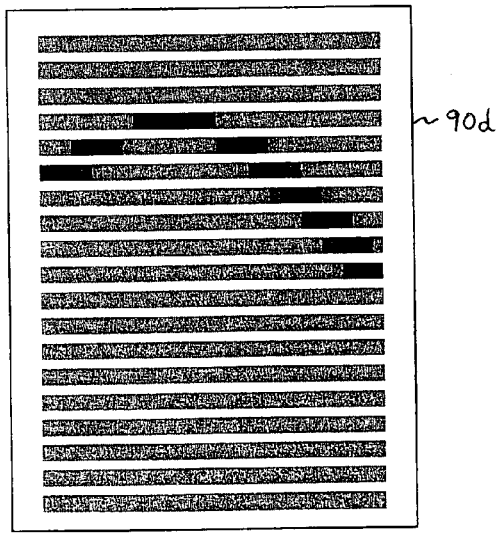
Combination of several types of misalignment
FIG. 9C
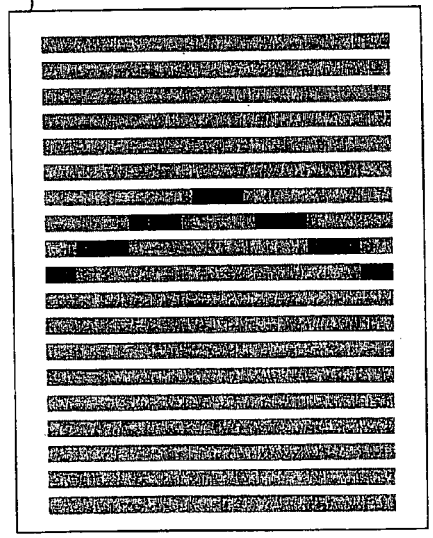
Differential nonlinearity misalignment

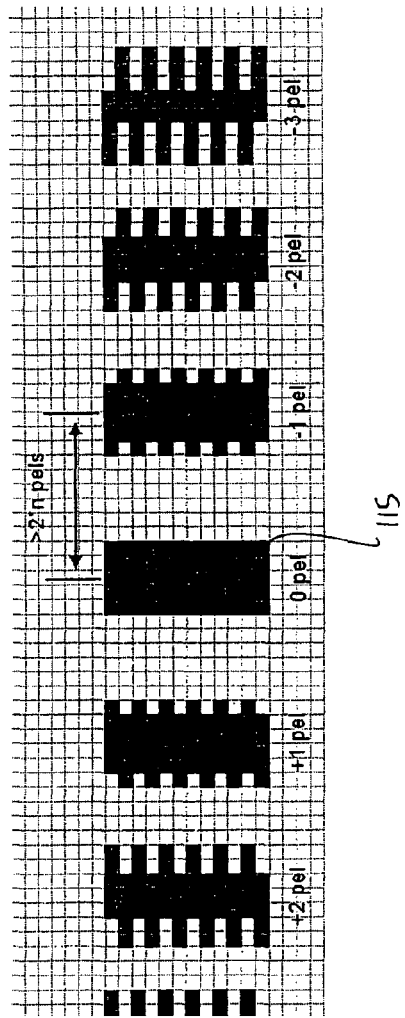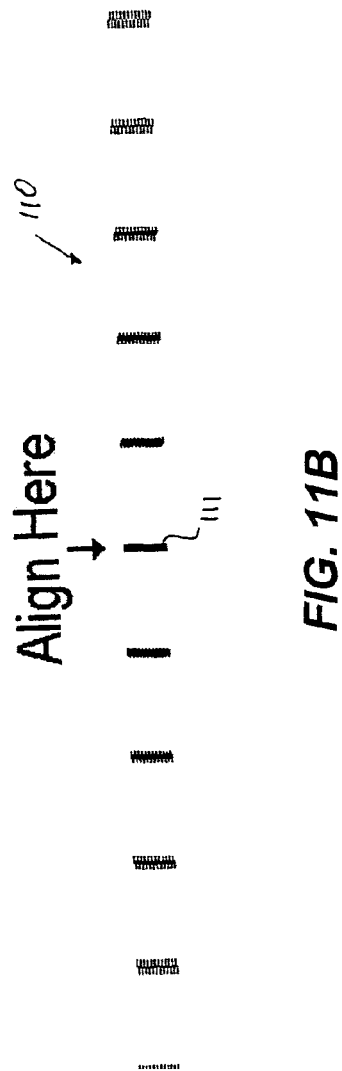
FIG.11A
FIG. 11B

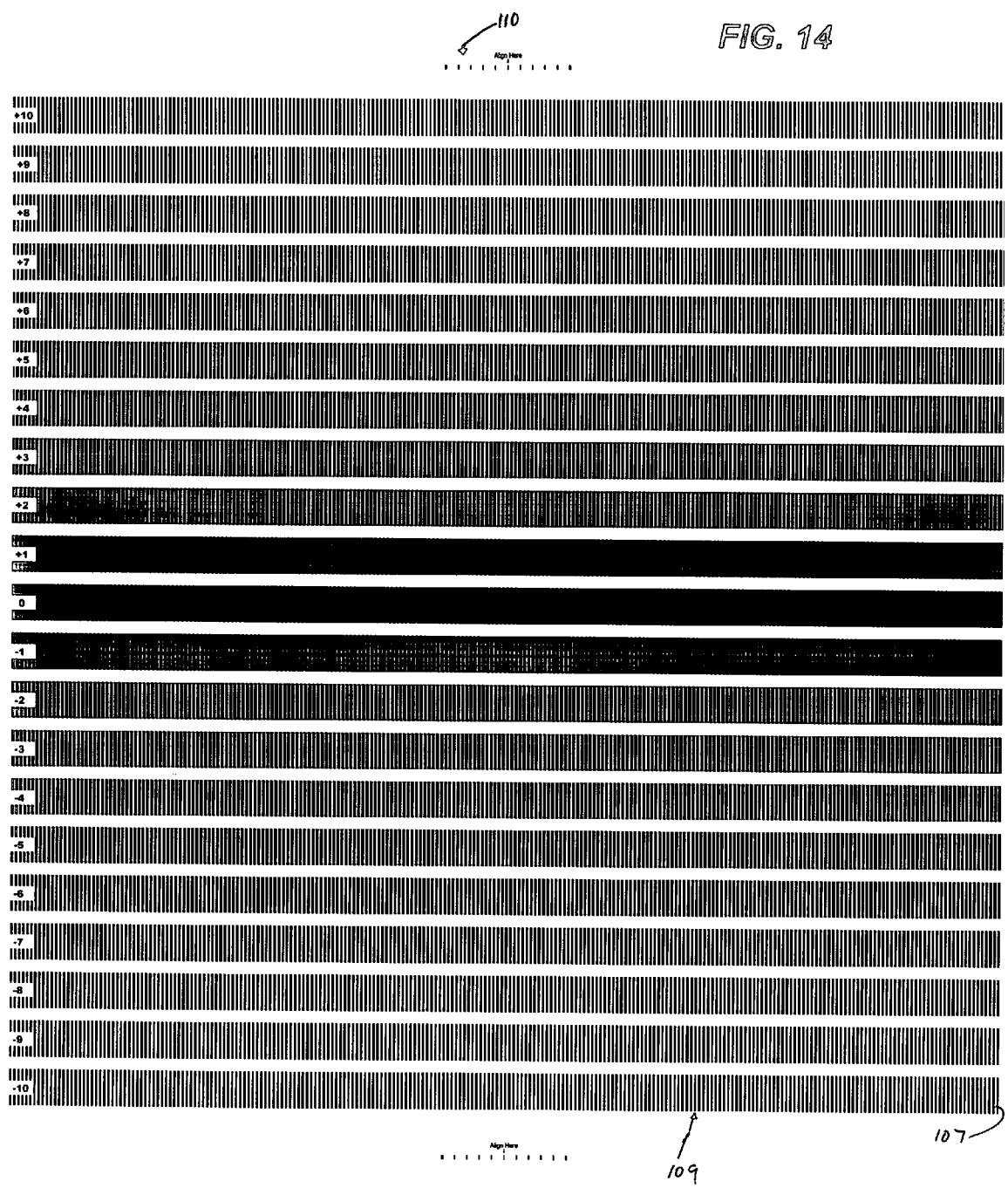

PRINT ALIGNMENT FOR BI-DIRECTIONALLY SCANNING ELECTROPHOTOGRAPHIC DEVICE

FIELD OF THE INVENTION

Generally, the present invention relates to electrophotographic devices, such as laser printers or copy machines. Particularly, it relates to improving print quality in electrophotographic devices utilizing bidirectional scanning. In one aspect, print calibration pages are prepared for manufacturing, servicing and end-user operations. In another, calibration pages include repeatedly tiled diagnostic patterns having intentional and unintentional pixel (pel) mismatch to facilitate visual or automated calibration.

BACKGROUND OF THE INVENTION

Typical electrophotographic (EP) devices have a spinning polygon mirror that directs a laser beam on a photoconductor, such as a drum, to create one or more scan lines of a latent to-be-printed image. With reference to FIG. 1, multiple scan lines (1-6) are shown and all extend in the direction of the arrows left-to-right in the scanning direction 10. Conveniently, common referencing of all scan lines can occur relative to a single laser beam sensor position 12, known commonly as a horizontal synchronization (or "hsync") position. Often, the hsync signal is defined in units of time for the engine of the EP device and its apparent location exists in a space somewhere off the edge of the printed page.

However, it has recently been suggested that torsion oscillator or resonant galvanometer structures can replace the traditional spinning polygon mirror. In this manner, scan lines occur in both the forward and backward directions (e.g., bi-directionally) thereby increasing efficiency of the EP device. Because of their small size, and fabrication techniques, the structures are also fairly suggested to reduce the relative cost of manufacturing. Unfortunately, scanning in two directions adds complexity to image referencing since two reference points need occur at opposite ends of the printed page and even the slightest of deviations between scan lines amplifies print image imperfections. Also, EP device parameters, such as beam sensor signal delays, optical component alignment, and galvanometer or oscillator scan profile nonlinearity must be measured and accounted for.

Accordingly, there exists a need in the art for calibration techniques for bi-directionally scanning EP devices. Particularly, there are needs by which the print alignment is accounted for at one or more of the stages of manufacturing, servicing or end-user operation. Naturally, any improvements should further contemplate good engineering practices, such as relative inexpensiveness, stability, low complexity, ease of implementation, etc.

SUMMARY OF THE INVENTION

The above-mentioned and other problems become solved by applying the principles and teachings associated with the hereinafter described print alignment for bi-directionally scanning electrophotographic (EP) devices, such as laser printers or copier machine. In its most basic sense, an EP device scans multiple scan lines in alternating directions to form a latent calibration image. A printed calibration image developed from the latent image is observed to determine whether misalignments of the scan lines exist, and to establish the type and magnitude of such misalignments. Corrections are then implemented so that future scan lines of future latent images produce better print quality.

Representatively, various diagnostic patterns are replicated to form multiple bars of a calibration page. In turn, a darkest of the bars represents a best calibration of the EP device. In a first pattern, no pixels (pels) are mismatched while a second pattern indeed mismatches the pels of the first pattern. Illustratively, the first pattern includes a substantially rectangular cell defining pluralities of pixels (pels) for at least a first and second scan line in opposite directions. A second pattern defines the first pattern save one or more of the pels of either the first or second scan lines, or both, being intentionally displaced at least one pel width in the scan direction. Upon repeatedly tiling groups of either the first or second patterns together, multiple bars of the calibration page are formed. The bars are stacked symmetrically about a central preferred best calibration bar and, in the event input image data corresponds nearly perfectly with a printed image of the EP device, the central bar will be the darkest. Upon miscalibration, however, the darkest bar will not correspond to the central bar.

In other aspects, users visually select the preferred darkest bar of a printed calibration and indicate a selection to the EP device. Alternatively, automated selection occurs after reading of the bars occurs internally or externally to the EP device.

These and other embodiments, aspects, advantages, and features of the present invention will be set forth in the description which follows, and in part will become apparent to those of ordinary skill in the art by reference to the following description of the invention and referenced drawings or by practice of the invention. The aspects, advantages, and features of the invention are realized and attained by means of the instrumentalities, procedures, and combinations particularly pointed out in the appended claims.

BRIEF DESCRIPTION OF THE DRAWINGS

The accompanying drawings incorporated in and forming a part of the specification, illustrate several aspects of the present invention, and together with the description serve to explain the principles of the invention. In the drawings:

FIGS. 9A-9D are diagrammatic views in accordance with the present invention of representative examples of calibration pages indicating various misalignments;

FIGS. 11A-11B are diagrammatic views in accordance with the present invention of alternate representative diagnostic patterns;

FIGS. 13 and 14 are diagrammatic views in accordance with the present invention of actual calibration pages of an EP device showing desirable alignment.

DETAILED DESCRIPTION OF THE ILLUSTRATED EMBODIMENTS

In the following detailed description of the illustrated embodiments, reference is made to the accompanying drawings that form a part hereof, and in which is shown by way of illustration, specific embodiments in which the invention may be practiced. These embodiments are described in sufficient detail to enable those skilled in the art to practice the invention and like numerals represent like details in the various figures. Also, it is to be understood that other embodiments may be utilized and that process, mechanical, electrical, software, and/or other changes may be made without departing from the scope of the present invention. In accordance with the present invention, aligning printing of a bi-directionally scanning electrophotographic (EP) device is hereafter described.

Figure 1:
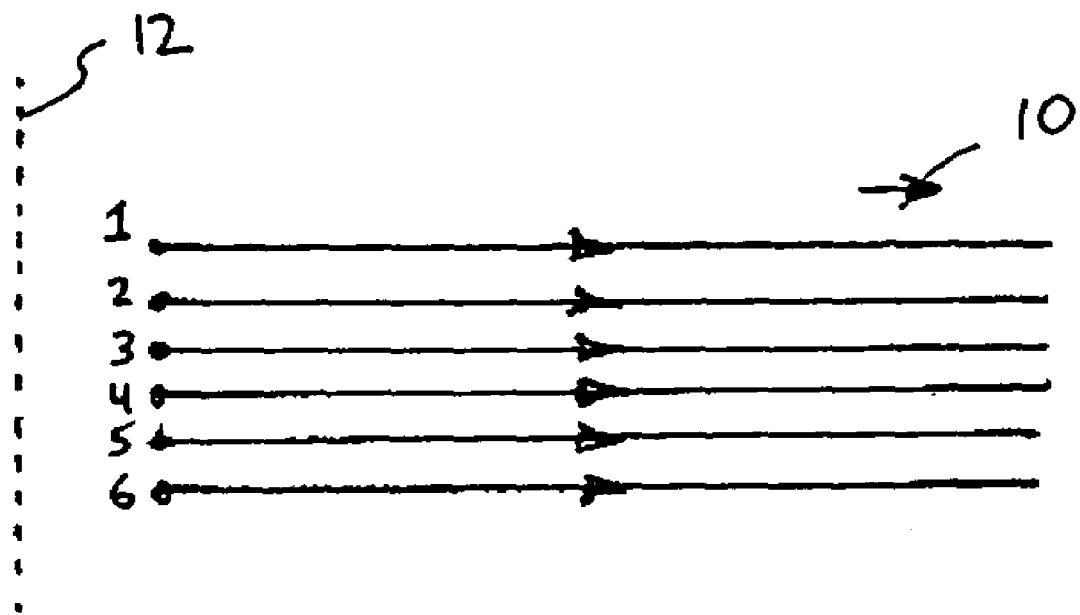
FIG. 1 is a diagrammatic view in accordance with the prior art of the scan lines and reference position of a conventional electrophotographic (EP) device.
Figure 2:
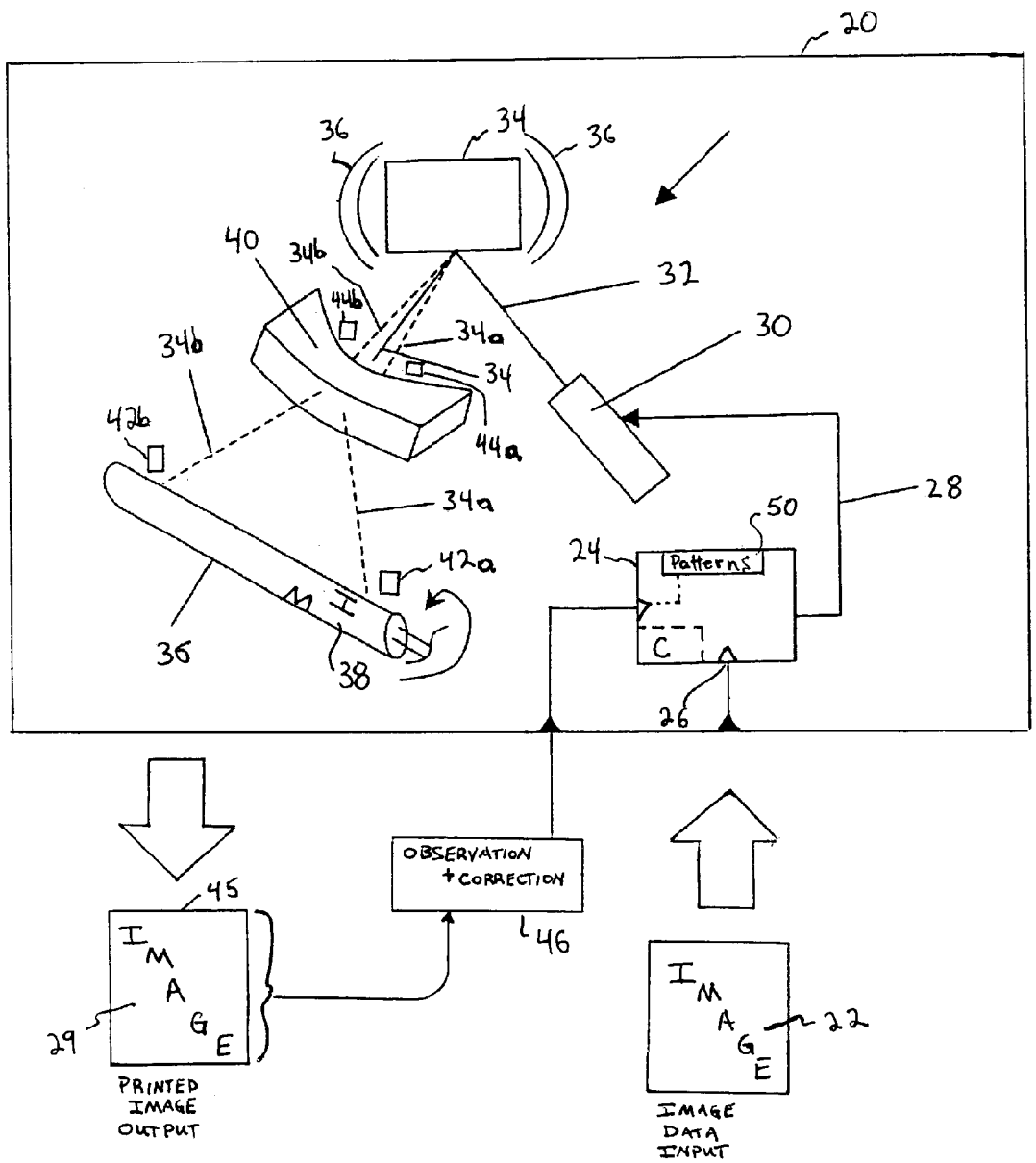
FIG. 2 is a diagrammatic view in accordance with the present invention of a representative bi-directionally scanning EP device.

With reference to FIG. 2, an EP device 20 of the invention representatively includes mono or color laser printers or copier machines. During use, image data 22 is supplied to the EP device from somewhere external, such as from an attendant computer, camera, scanner, PDA, laptop, etc. A controller 24 receives the image data at an input 26 and configures an appropriate output signal 28 to produce a latent image of the image data. Ultimately, a hard-copy printed image 29 of the image data is obtained from the latent image. If print alignment in the EP device is well calibrated, the printed image 29 will correspond nearly exactly with the image data input 22. If not, the printed image will have a variety of misalignments.

With more specificity, the output signal 28 energizes a laser 30 to produce a beam 32 directed at a torsion oscillator or resonant galvanometer 34. As the oscillator or galvanometer moves (indicated by oscillation wave lines 36) the beam 32 is reflectively cast to create beam lines 34a, 34b on either side of a central position 34. As a result, multiple scan lines in alternate directions are formed on a photoconductor, such as a drum 36, and together represent a latent image 38 of the image data supplied to the controller. Optically, certain lenses 40, mirrors or other structures may exist intermediate to the photoconductor to transform the rotational scan of the laser beam reflected from the oscillator or galvanometer 34 into a substantially linear scan of the beam at the drum 36, with substantially uniform linear scan velocity and with substantially uniform laser beam spot size along the imaging area of the drum. To provide common reference for the beam lines, various sensors are employed. Preferably, a forward hsync sensor 42a and a reverse hsync sensor 42b are positioned near opposite ends of the photoconductor to provide a common reference for all forward scanning beam lines and all backward scanning beam lines, respectively. In addition to, or in lieu of the sensors 42a, 42b, forward and reverse hsync sensors may be positioned at 44a and 44b, upstream of the representative optics 40. Regardless, the outputs of these sensors are supplied to the controller 24 for referencing correct locations of the scan line(s) of the latent images. Downstream of the latent image, and not shown, the printed image is formed by applying toner to the latent image and transferring it to a media, such as a sheet of paper. Thereafter, the media 45 with the printed image 29 exits the EP device where it can be handled by users for a variety of intended purposes.

As it relates to determining print aligning of the EP device, the printed image 29 is observed in some fashion and a correction implemented so that future scan lines of future latent images are altered to make the printed image appear as close to the image data input as possible. In essence, the observation and correction is a feedback loop, of sorts. As shown, the image is observed at 46 and a correction indicated to the EP device 20. In one instance, this corresponds to an end-user making a visual observation of the printed image and informing the EP device, such as by way of a user interface of an attendant computer (not shown) or an operator panel directly on the EP device, of a preferred correction. In another, a reading of the printed image occurs and an automated selection is made and conveyed to the EP device. Reading, as is well known, can occur by way of optical scanners or other devices. In still another instance, the observation and correction occurs internal to the EP device such as by observing a printed image still in the EP device or by observing the latent image 38 on the photoconductor. Corrections C then occur by way of selection in the controller 24.

Also, observation and correction can occur relative to a specially made calibration page that manufacturers, service technicians or end-user operators can employ as part of a manufacturing, servicing or end-user act for aligning print. To this end, the remaining discussion representatively focuses on a printed image 29 on a media 45 in the form of a calibration page initiated not from externally supplied image data 22, but a variety of diagnostic patterns 50 from internal the controller 24 or an attendant device that normally supplies the image data 22. That is, the controller and/or attendant device supply or define predetermined patterns to create a calibration page of the type later described regarding FIGS. 13 and 14. The calibration page, however, is not typically thought of as image data in the sense that end-users want to regularly print this output. Ultimately, the calibration page is used to align print of the EP device to overcome the potential misalignment problems of FIGS. 4A-4C.

Figure 3:
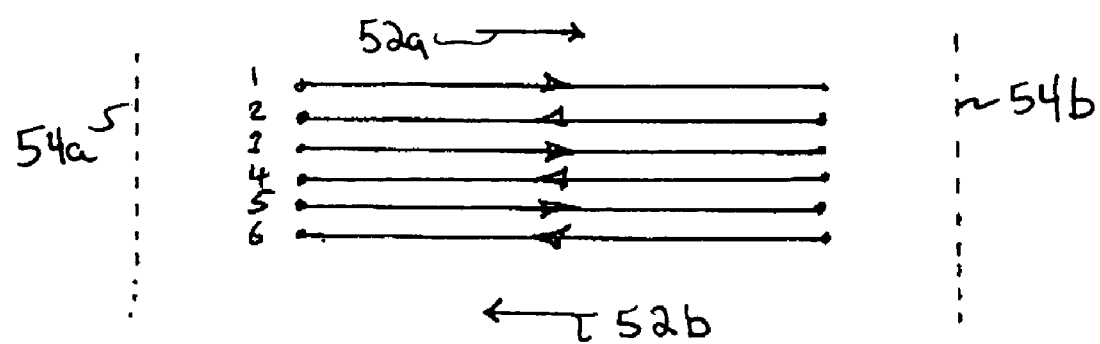
FIG. 3 is a diagrammatic view in accordance with the present invention of desirable scan lines and reference positions in a bi-directionally scanning EP device.

Before then, FIG. 3 conceptually shows the desired scan lines and reference positions in a bi-directionally scanning EP device and fairly suggests the nomenclature for use with later figures. Namely, a plurality of scan lines forming a latent image on a photoconductor, for example, are sequentially numbered 1-6, with odd numbered scan lines (1, 3, and 5) occurring in a forward scan direction 52a opposite the even numbered scan lines (2, 4, and 6) that occur in a backward scan direction 52b. Also, the forward and reverse scan lines alternate with one another and such is the nature of scanning with the torsion oscillator or resonant galvanometer of the EP device and its attendant formation of forward-scanning beam lines 34a and backward- or reverse-scanning beam lines 34b. Also, the reference position 54a supplies a common reference point for each of the forward scanning lines and is borne about by the signal from the forward hsync sensor. Conversely, the reference position 54b supplies a common reference point for each of the backward scanning lines and is borne about by the signal from the reverse hsync sensor.

Figure 4A:
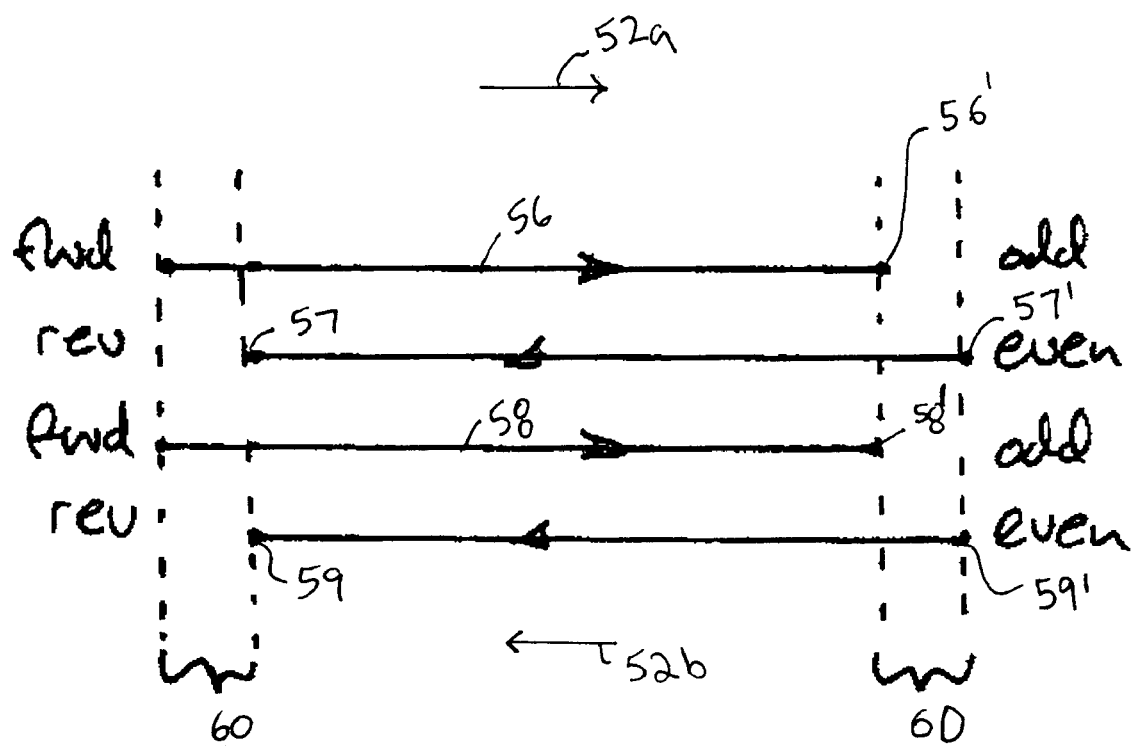
FIGS. 4A-4C are diagrammatic views in accordance with the present invention of representative potential misalignments in a bi-directionally scanning EP device.
Figure 4B:
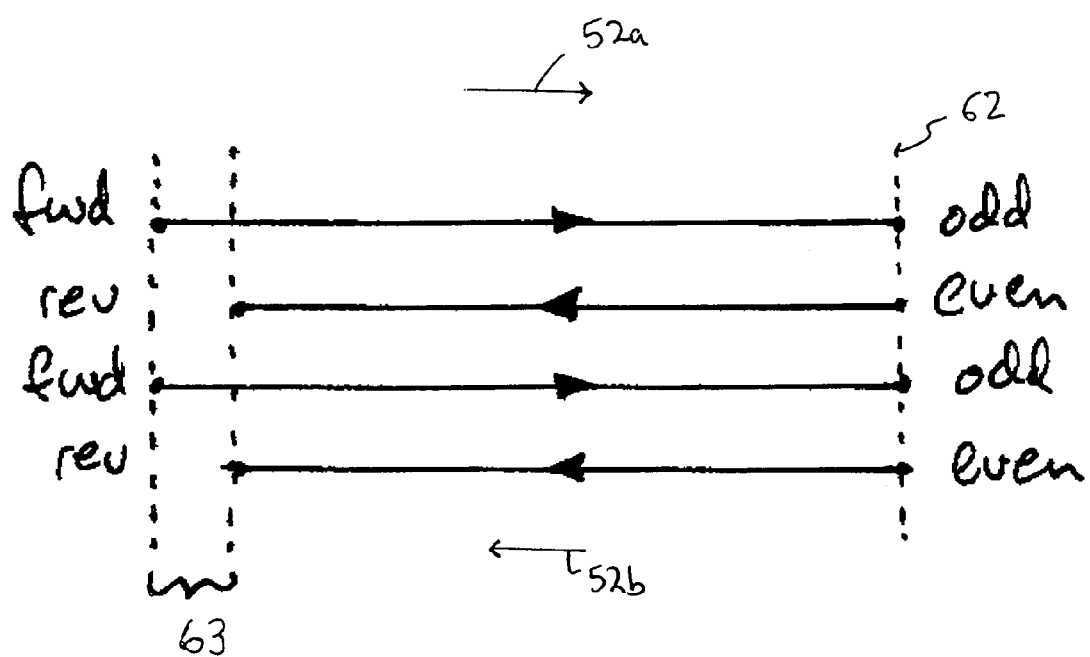
Figure 4C:
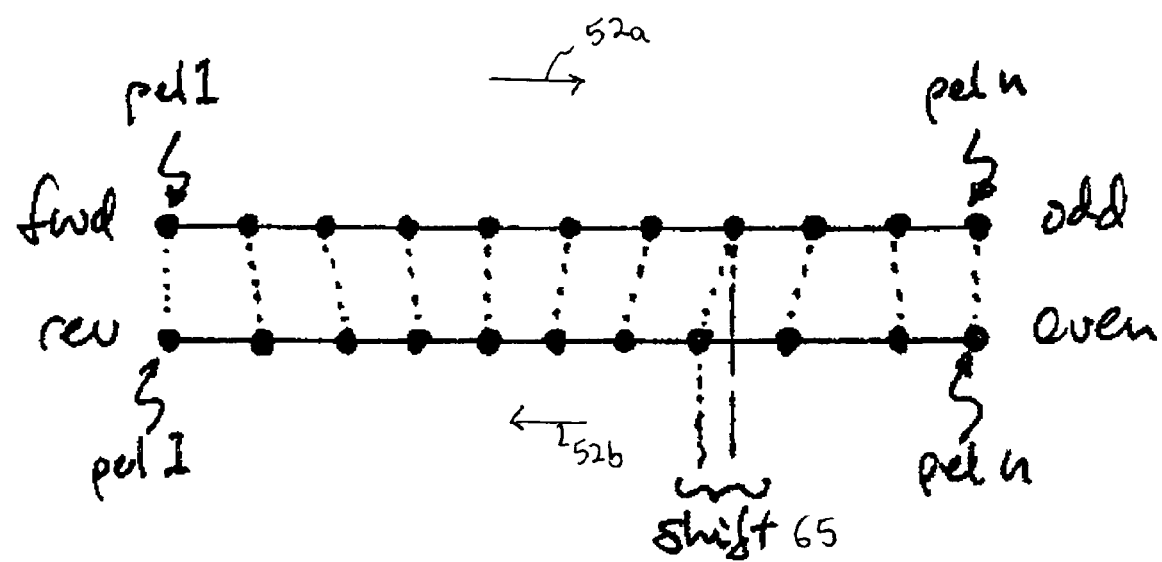

With reference to FIGS. 4A-4C, the potential misalignments of bi-directional scans in an EP device may be classified into three basic categories. In the first (FIG. 4A), the end points 56', 58' of forward (fwd) scan lines 56, 58 do not coincide with the start points 57', 59' of reverse (rev) scan lines 57, 59. As used herein, this phenomenon is known as straight bi-directional misalignment. Namely, the scan lines are all of relatively equal length thereby creating a nearly equal amount 60 of misplacement at each end of the scans. In the second (FIG. 4B), line length mismatch occurs. That is, the forward and backward scan lines are aligned on one side 62, but not on the other side where an amount 63 of mismatch occurs. This is caused by forward and reverse scan lines having different lengths. In the third (FIG. 4C), differential nonlinearity is illustrated. For instance, printed pels (pel #1-pel #n) within each forward or reverse scan are intended to be equally spaced apart. If there are differences in the linearity of pel placement between forward and reverse scans, however, there will be individual shifts 65 in the placement of sets of pels that are intended to occur in the same scan location among scans. Skilled artisans will appreciate, however, that misalignments of scan lines in a bi-directionally scanning EP device take the form of some combination of all of the foregoing types of misalignment. To this end, a visualization technique (e.g., the calibration page) simply reveals these misalignments which can be overcome by way of observation and correction.

Figure 5:
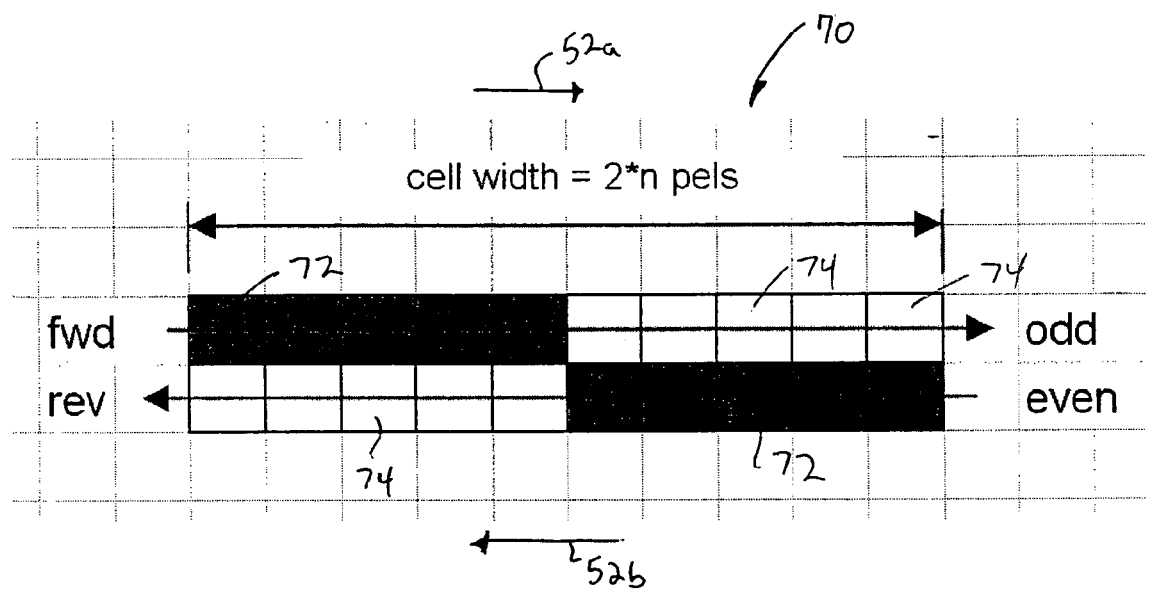
FIG. 5 is a diagrammatic view in accordance with the present invention of a representative diagnostic pattern having no intentional pel mismatch.
Figure 6:
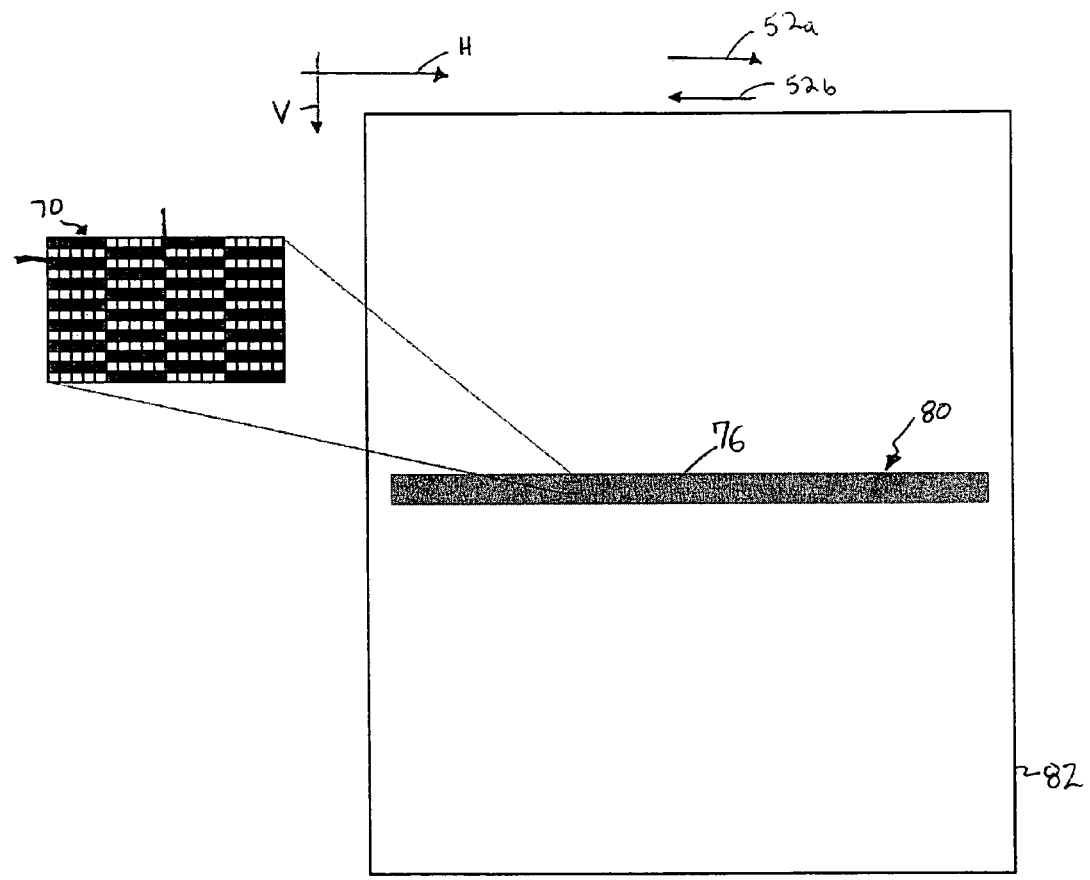
FIG. 6 is a diagrammatic view in accordance with the present invention of the pattern of FIG. 5 repeatedly tiled to form a portion of a representative calibration page.

With reference to FIG. 5, a representative diagnostic pattern for constructing a calibration page is given generally as 70. In essence, the pattern defines a substantially rectangular cell of pels for at least a first (fwd) and second (rev) scan line of opposite directions. It is also a checkerboard pattern, of sorts, elongated in the scan direction 52. As illustrated, black boxes 72 (only a few labeled) indicate printed pels while white boxes 74 (only a few labeled) indicate unprinted pels. The overall cell width is 2*n pels, where n is the number of pels chosen for the maximum detection range of bidirectional shift of the printed image. Each of the two scan lines of the cell contain n printed pels and n non-printed pels arranged in the elongated checkerboard pattern. Upon repeatedly tiling the cell 70 or pattern together, in both horizontal H and vertical V directions, a relative large 50% grayscale region 76 is formed, such as in FIG. 6. Also, by conducting tiling such that a lengthy tiling occurs in the horizontal H direction relative to tiling in the vertical V direction, the grayscale region 76 takes the form of a bar 80. Of course, other shapes are possible. Moreover, the bar 80 in this instance is formed centrally in a calibration page 82 and the rationale for this will become apparent with reference to the remaining figures.

Figure 7A:
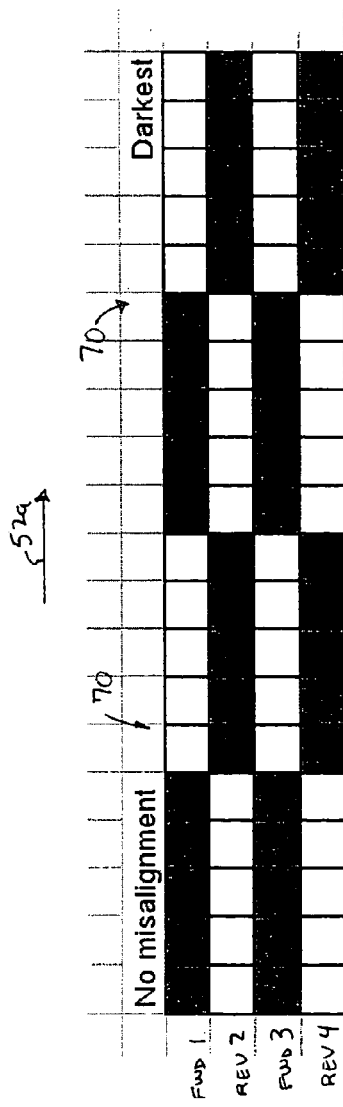
FIGS. 7A-7C are diagrammatic views in accordance with the present invention of the representative diagnostic pattern of FIG. 5 having intentional pel mismatch.

With reference to FIG. 7A, the cell 70 is shown tiled together in a 2×2 matrix. Since alternating scan lines (e.g., FWD 1 and Rev 2) are formed in opposite directions, in the event bi-directional misalignment in an EP device exists, there is an overall shift of the alternating scan lines relative to each other. In turn, this shift causes a perceived grayscale darkness that is easily visible in a printed calibration page that can be later corrected.

Figure 7B:
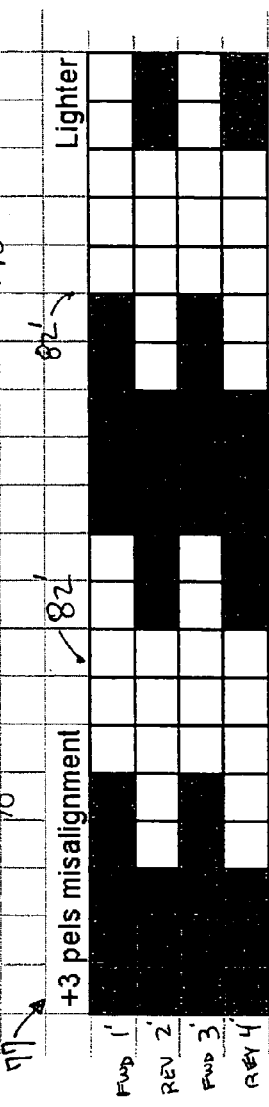
Figure 7C:
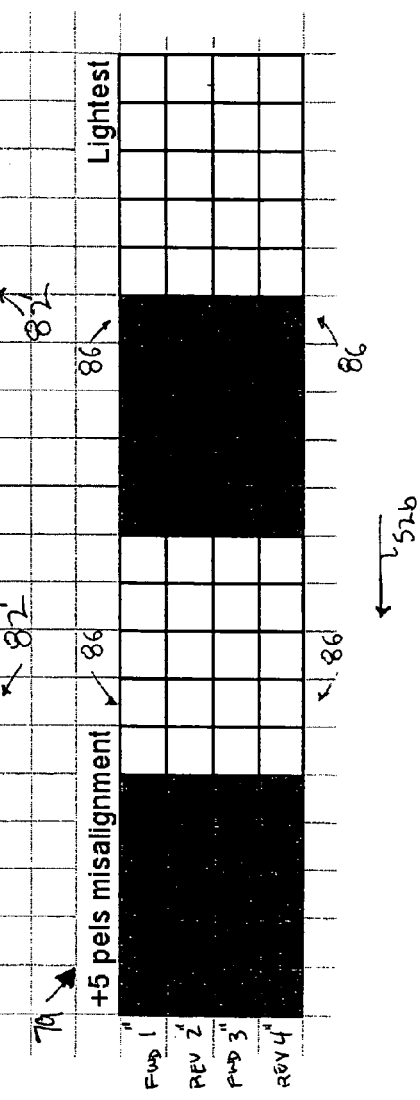

For instance, if an EP device used the tiled together cell 70 of FIG. 7A as image input data (e.g., 22, FIG. 2) and had an internal calibration issue corresponding to a misalignment of +3 pels in creating a printed image, an actual printed page from the EP device would look like the printed image 77 in FIG. 7B. Namely, the pels in the FWD 1' scan line would be situated properly but those in REV 2' would be off by an amount of three pels. (The same is also true of scan line REV 2".) Similarly, if an EP device had an internal calibration issue such that printed images shifted by an amount of +5 pels compared to image input data corresponding to FIG. 7A, an actual printed page from the EP device would look like the printed image 79 in FIG. 7C. Namely, the pels in the FWD 1" scan line would be the same, but those in REV 2" would be offset by an amount of five pels. (The same is also true of scan line REV 4".) Overall, a perfectly calibrated EP device would print the image of FIG. 7A exactly as inputted from FIG. 7A and such would be darker than any other image having misalignment. An EP device having a misalignment of +3 pels, on the other hand, would print an output image 77 and such would be lighter than a perfectly calibrated device. For the EP device with a misalignment of +5 pels, an output image corresponding to image 79 would be lighter than image 77, in turn, lighter than the image of FIG. 7A. In other words, FIG. 7C would be the lightest while FIG. 7A would be the darkest. It should be appreciated, however, the amount of change in perceived darkness of a tiled cell experiencing bi-directional misalignment depends on many printer system parameters, including but not limited to printed single-pel size, and how the EP process varies to deposit toner as pel density changes.

With this in mind, one method of obtaining quantitative measurements of misalignment is to modify the basic cell, e.g., 70, to include known amounts of forward to reverse scan shifts in the image information. Then, a quantitative misalignment diagnostic image can be printed with regions of known bi-directional shift and the amount of misalignment can be read from the print visually by identifying the darkest of these regions.

Figure 8:
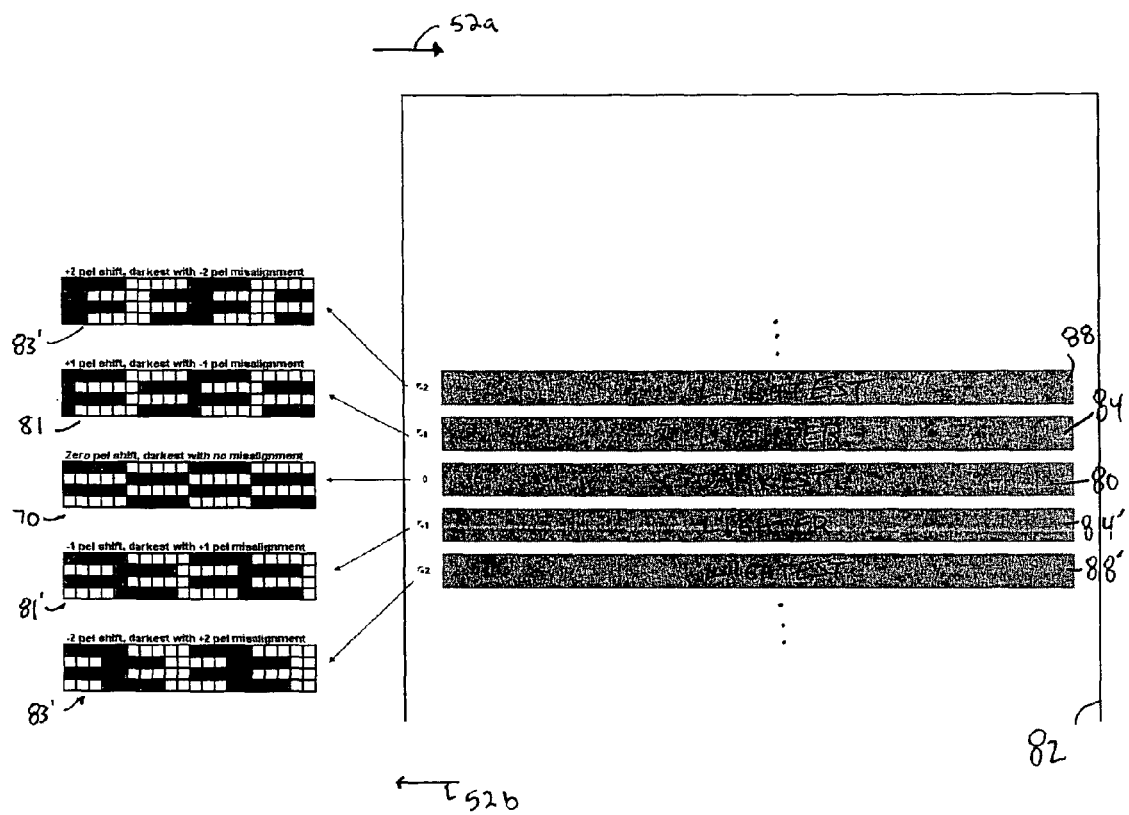
FIG. 8 is a diagrammatic view in accordance with the present invention of a representative calibration page having repeatedly tiled patterns.

With reference to FIG. 7A, again, but for a purpose different than the foregoing discussion (e.g., to now describe the formation of a full calibration page), the cell 70 is shown tiled together in a 2×2 matrix of cells 70. In FIG. 7B, however, a second pattern 82' (also tiled together in a 2×2 matrix) defines the same first pattern of cell 70 except at least one of the pels of either the first (FWD 1) or second (REV 2) scan lines is intentionally displaced at least one pel width in the scan direction 52 (e.g., 52a or 52b). In this instance, it is intentionally displaced by an amount corresponding to 3 pels and such occurs in the scan line labeled REV 2' (which also is repeated in the scan line labeled REV 4', since the cell 82' of the second pattern is repeatedly tiled together). As a result, forming the second pattern of cells 82' together in a horizontal bar in calibration page yields a visually lighter bar as compared to the bar formed by repeatedly tiling together the first cell 70 having no intentionally misplaced pels. Similarly, a third pattern 86 (also tiled together in a 2×2 matrix) defines the same first pattern of cell 70 except at least one of the pels of either the first (FWD 1) or second (REV 2) scan lines is intentionally displaced at least one pel width in the scan direction 52 (e.g., 52a or 52b). In this instance, it is intentionally displaced by an amount corresponding to 5 pels and such occurs in the scan line labeled REV 2" (which also is repeated in the scan line labeled REV 4", since the cell 86 of the second pattern is repeatedly tiled together). As a result, forming the third pattern of cells 86 together in a horizontal bar in calibration page yields a visually lighter bar as compared to the bar formed by repeatedly tiling together the second cell 82', in turn, yielding a visually lighter bar as compared to the bar formed by repeatedly tiling together the first cell 70 having no intentionally misplaced pels (the labels darkest, lighter and lightest indicate this relationship). In other words, relative amounts of local differential nonlinearity are visible as varying grayscale darkness of the image and differential nonlinearity over the width of a page can be visualized with a tiled cell image covering the desired region. By following this approach, a representative example of a calibration page is formed and the darkest bar of the many bars represents the preferred calibration setting of the EP device. With reference to FIG. 8, cell 70 is repeatedly tiled together to form a centrally disposed bar 80 on a calibration page 82. Symmetrical about this bar, are other bars 84, 84' and 88, 88'. In composition, the bars 84 and 84' represent the first pattern of cell 70 with an intentionally misplaced pel of +1 and −1, respectively, in the scan lines formed in direction 52b, to form cells 81, 81' repeatedly tiled together. Similarly, the bars 88 and 88' represent the first pattern of cell 70 with an intentionally misplaced pel of +2 and −2, respectively, in the scan lines formed in direction 52b, to form cells 83, 83' repeatedly tiled together. As a result, a perfectly calibrated EP device would yield a printed calibration page 82 with bar 80 being the darkest, each of the bars 84, 84' being the next lightest, and each of the bars 88, 88' being the lightest, as indicated. Also, ellipses indicate the notion that multiple other bars would exist on the calibration page. Such would also likely be the result of repeatedly tiling together patterns having a plus or minus one pel difference with the immediately adjacent bar that is closest to the central bar. Representatively, the next bar above bar 88 would be a +3 pel misalignment bar and would be formed by repeatedly tiling together the cell 82' of FIG. 7C.

However, in a less than perfectly calibrated EP device, it is expected that a bar other than the central bar will be the darkest. Then, upon observation of the darkest bar and a corresponding indication to the EP device of which bar that is, the EP device will implement a correction such that if another calibration page were printed thereafter, the darkest bar then would indeed be the centrally disposed bar 80. In other words, the objective here is to implement a correction in an EP device such that, upon receipt of future image data input to the EP device, the image data will be scanned with the correction factor in place so that the printed hard copy output will mirror the input as closely as possible. Of course, skilled artisans will appreciate that the number of bars, the shapes of bars, the orientation of bars, having bars at all, the basic cell, etc., can be altered and still achieve the objective of calibration in this fashion.

For instance, it is possible to have the calibration page or diagnostic image indicate either the actual bidirectional misalignment amount in pels, according to an agreed upon sign convention, or to indicate the negative amount of pels of correction required to align the image to zero pels of misalignment. The full range of non-aliased indication of misalignment depends on the width of the unit cell used to construct the tiled image regions. With a cell of n=5 as defined in FIG. 5, a straight bidirectional misalignment of +5 pels will appear in a diagnostic image the same as a misalignment of −5 pels. The cell width may be increased to accommodate larger indicated misalignments, but there is some maximum width past which the range of perceived darkness with misalignment decreases. Typical practical limits are around 10 pels of misalignment in either direction for the EP devices presently under consideration by the inventors. Naturally, other EP devices may not be so limited.

When categories other than straight bidirectional misalignment, e.g., FIG. 4A, are encountered, the regions of perceived darkness of the tiled cells can show much more complexity in the misalignment and nonlinearity profile of the scanning system of the EP device. For example, the second category of misalignment, line length mismatch, e.g., FIG. 4B, will not show a single horizontal bar of the calibration page to be dark. Instead, there will be varying misalignment across the calibration page in the scan direction that will produce smaller dark regions within many of the horizontal bars. The overall effect will be a slanted dark line traversing the number of lines corresponding to maximum misalignment at one end of the page.

With reference to FIGS. 9A-9D, representative calibration pages are shown according to the potential misalignments of FIGS. 4A-4C. In FIG. 9A, a calibration page 90a is shown that depicts isolated or purely straight bi-directional misalignment according to FIG. 4A. In this instance, the darkest bar 91 is three bars above the centrally disposed bar 93. In FIG. 9b, a calibration page 90b is shown that depicts isolated or pure line length misalignment according to FIG. 4B. In FIG. 9c, a calibration page 90c is shown that depicts isolated or pure differential nonlinearity misalignment according to FIG. 4C. In practice, however, it is unlikely that any of the calibration pages 90, 90b, and 90c will appear as illustrated since most forms of misalignment in EP devices are combinations of the three basic misalignments of FIGS. 4A-4C. Thus, the calibration page 90d is representative of multiple types of misalignments. As before, FIGS. 13 and 14 also show actual calibration pages of an EP device and better represent the principle.

Figure 10:
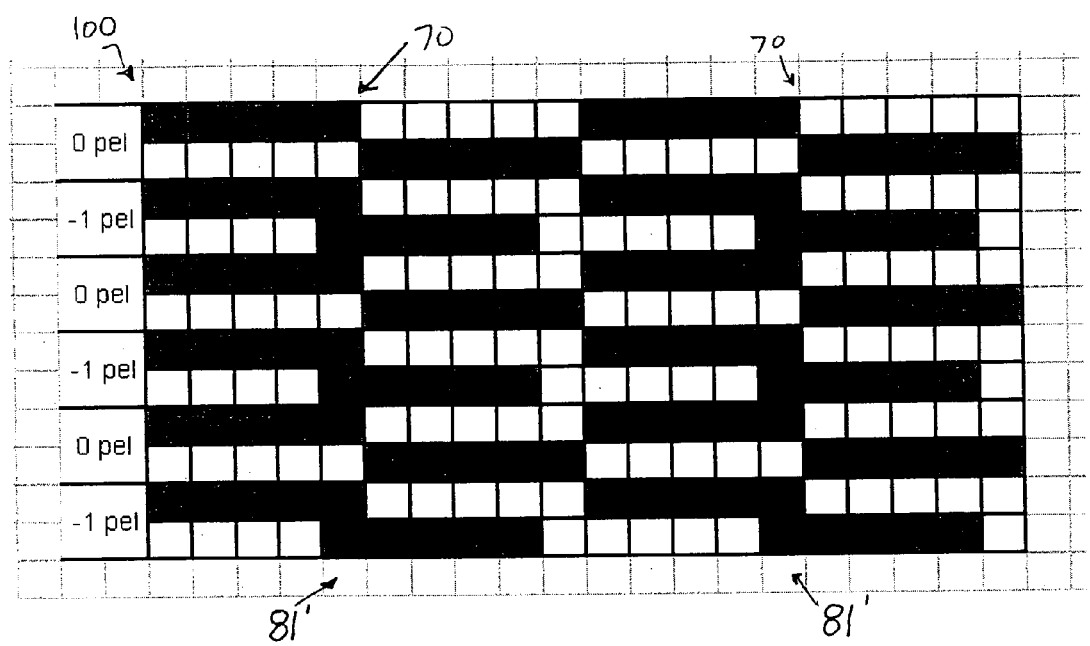
FIG. 10 is a diagrammatic view in accordance with the present invention of the representative pattern of FIG. 5 dithered together with a pattern having intentional pel mismatch to form a single bar.
Figure 13:
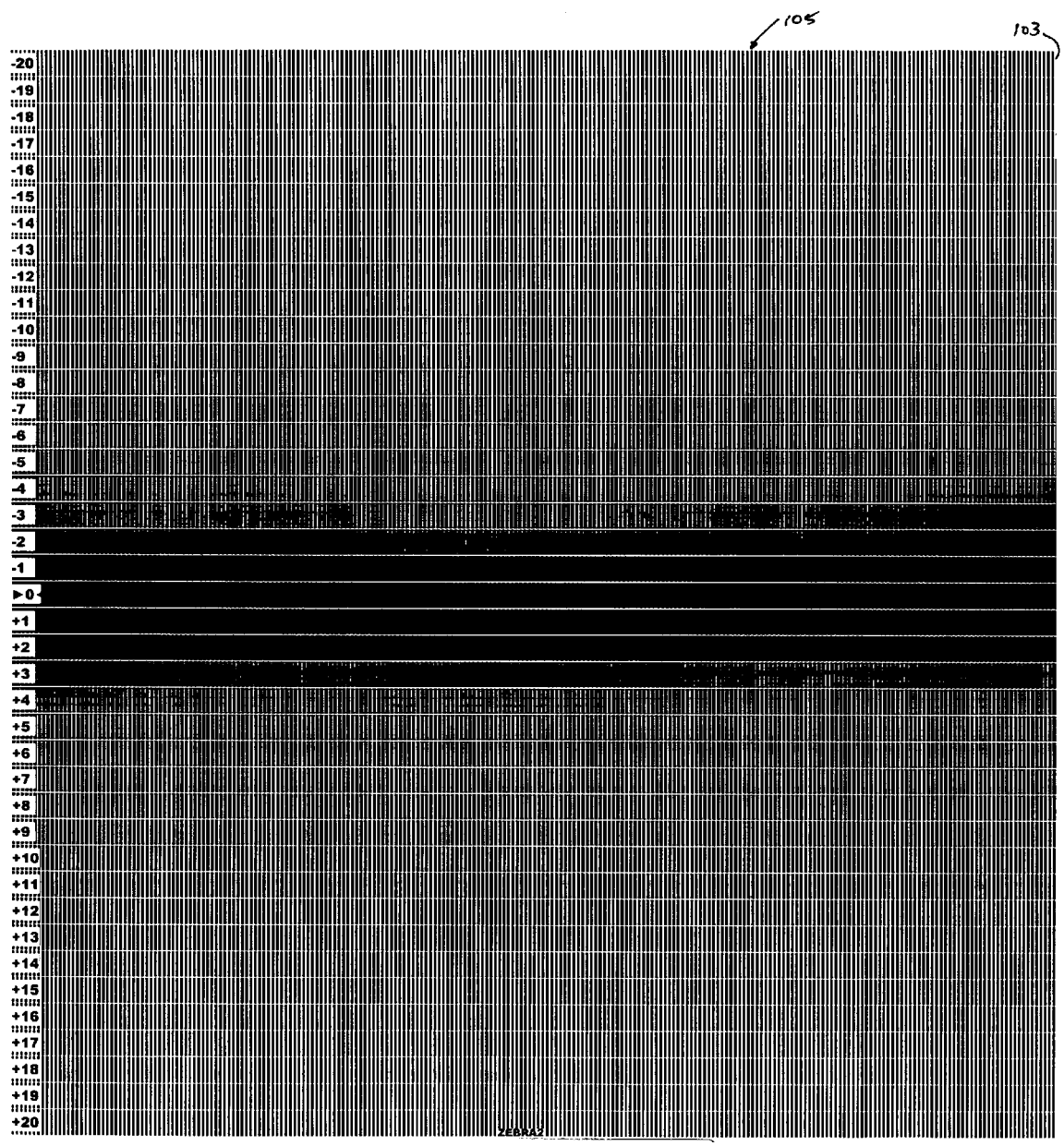

With reference to FIG. 10, an extension of the foregoing principles relates to that of dithering. That is, a calibration page 82 in FIG. 8 has a resolution of one pel of bidirectional misalignment per each of the bars 84, 84' and 88, 88', other than the centrally disposed bar 80 with no intentional pel misalignment. Yet, to achieve a fractional resolution of a pel, a bar 100 of a calibration page can be repeatedly tiled with the cell 70 of the first diagnostic pattern having no intentional misplaced pel and a cell 81' including an intentionally misplaced pel. In this instance, the basic cell 70 is repeatedly tiled together in a bar 100 for a calibration page with the cell 81' having a −1 pel amount of misalignment in the reverse scan lines. As a result, more increments of visibly discernable misalignments are now possible with the ultimate calibration page having more bars to choose from. In practice, this is seen by comparing FIG. 13 with FIG. 14. In FIG. 13, half-pel resolutions have been implemented in the bars 103 of the calibration page 105. In FIG. 14, on the other hand, full pel resolution is implemented in the bars 107 of the calibration page 109. Of course, skilled artisan will know to extend the dithering principle for other bars. For example, mixing cells with ±2 and ±3 pel misplacement in a single bar of a calibration page will achieve an effective ±2.5 pel misalignment indicator. Additionally, other dithering configurations are possible, such as three successive tiled patterns with two patterns having 0 pel misplacement and one pattern having +1 pel misalignment, yielding an effective ⅓ pel misalignment indicator. In general, a dither group consisting of n tiled patterns with m of the patterns having a pel misplacement d and (n−m) patterns having a pel misplacement of d+1 will appear darkest if the misalignment is d+(n−m)/n.

Since there is an aliasing effect when bi-directional alignment exceeds n pels, defined where the cell 70 is 2*n pels wide, misalignments must be within an expected range for the calibration page or diagnostic image to be useful. In cases where potential misalignments can exceed n pels, there is an alignment feature that can be included in the calibration page to extend the range of misalignment measurement. In other words, if the darkest bar of the calibration page actually exceeded the number of pels, e.g., plus or minus 10 pels (FIG. 14), and looped around such that the −8 bar represented the darkest bar, observers would simply believe the amount of misalignment was 8 pels when the reality is such that the amount of misalignment is on the order of 12 pels. Thus, a validity check of sorts is needed in some instances of calibration to ensure that the calibration of the EP device is not exceptionally out of order. In a representative embodiment, the basic construction of the cell 70 of FIG. 5 is repeated, but with a narrower vertical orientation. With reference to FIGS. 11A and 11B, small regions of unit cells are stacked, with regions of known pel shifts being spaced apart in the forward or backward scan direction 52 by a distance greater than 2*n pels, and preferably by a distance of at least 3*n pels. Misalignment is then indicated by the narrowest (e.g., thinnest in the scan direction 52) and darkest region 111. FIG. 11A shows how the regions 113 are constructed, e.g., intentionally misplacing one or more pels in one of the scan lines 1-12 relative to a perfectly stacked region 115. In FIG. 11B, an actual enlarged image 110 uses coarse wide-range misalignment measurement to get beyond the 10 pel limit of the rest of the calibration page, such as in FIG. 14. FIG. 14 also shows the image 110 in actual size and a representative placement during utilization a calibration page. Depending on the type of information required, the regions 115 may be put in different areas of the calibration page (e.g., top center, bottom left, etc.) and can be made into different sizes and shapes.

Figures 12A, 12B, 12C, 12D:
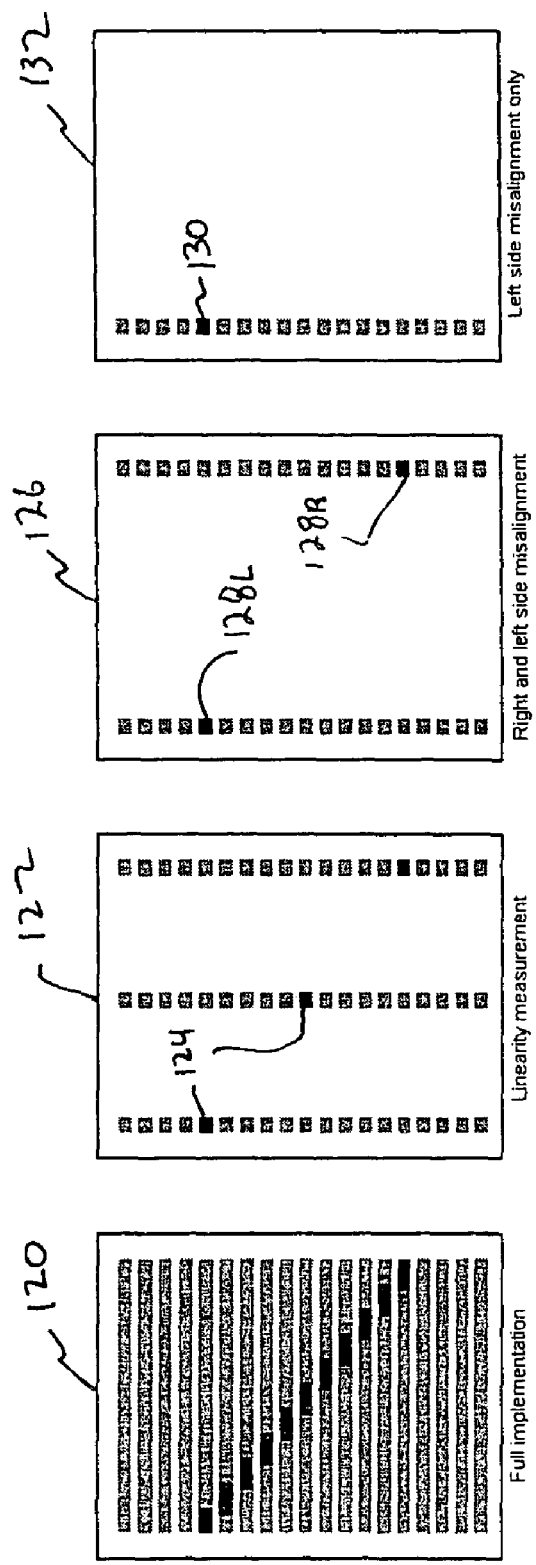
FIGS. 12A-12D are diagrammatic views in accordance with the present invention of representative less complex calibration pages compared to a full calibration page.

Appreciating that calibration pages may become complex to end-users or service technicians, FIGS. 12B-12D are representative examples of eliminating complexity from a fully-implemented calibration page 120 in FIG. 12A. In FIG. 12B, calibration page 122 shows one or more dark patches for making linearity comparisons. In FIG. 12C, calibration page 126 shows darks patches 128L, 128R per a left and right side of the page for right and left side scan misaligmuents. In FIG. 12D, a single dark patch 130 on calibration page 132 is given.

In still other embodiments, skilled artisans will appreciate that the foregoing described processes can be performed in an iterative fashion. For instance, it is contemplated that a first calibration page will be printed, such that a first correction will be implemented upon a first step of observing a first misalignment. From there, a second calibration page will be printed (including the first correction), such that a second correction will be implemented upon a second step of observing a second misalignment. From there, a third calibration page is printed (including the first and second correction), such that a third correction will be implemented upon a third step of observing a third misalignment, and so on until the best calibration of the EP device is implemented. Naturally, iterations can be fewer or more than that described and can zero-in on the best calibration in a variety of ways. Representatively, iterations can embody: an over, then under, then over again, etc. methodology with decreasingly smaller over- and undershoots; coarse, then fine, then finer, etc. methodology; a positive correction, a negative correction, a positive correction, etc. methodology; or other.

Finally, one of ordinary skill in the art will recognize that additional embodiments of the invention are also possible without departing from the teachings herein. This detailed description, and particularly the specific details of the exemplary embodiments, is given primarily for clarity of understanding, and no unnecessary limitations are to be imported, for modifications will become obvious to those skilled in the art upon reading this disclosure and may be made without departing from the spirit or scope of the invention. Relatively apparent modifications, of course, include combining the various features of one or more figures with the features of one or more of other figures.

The invention claimed is:

1. A method of aligning printing of a bi-directionally scanning electrophotographic device, comprising:

scanning scan lines of a latent image in a first scan direction and a second scan direction opposite the first scan direction on a photoconductive member of the electrophotographic device, wherein the step of scanning further comprises:

forming a first diagnostic pattern having no intentional pel mismatch and forming a second diagnostic pattern having intentional pel mismatch;

repeatedly tiling the first diagnostic pattern and the second diagnostic pattern to define a first portion of the latent image, the repeated tiling thereby creating a latent calibration page having a plurality of latent bars on the photoconductive member of the electrophotographic device;

printing a calibration page from the latent calibration page;

observing bars in the calibration page, and based on the observation determining at least one of line length mismatch between scan lines in the first scan direction and scan lines in the second scan direction in which a scan line in the first scan direction has a different length than a scan line in the second scan direction, and differential pel nonlinearity between the first and second scan directions in which spacing between locations of one or more pels in the first scan direction is different than spacing between locations of the one or more pels in the second scan direction; and implementing a correction for altering future scan lines in the first and second scan directions based upon the determining.

2. The method of claim 1, wherein the observing further includes comparing the printed image to image data supplied to the electrophotographic device for forming the image.

3. The method of claim 1, wherein the determining comprises, for each of a plurality of bars on the calibration page, identifying at least one location of a darker portion of the bar, wherein a darker bar portion is less than an entire length of the bar, and wherein the correction implemented is based upon the location identifications.

4. The method of claim 1, wherein the repeatedly tiling comprises tiling the first and diagnostic patterns on the same scan line for a plurality of scan lines, and wherein the correction implemented has a resolution of a fraction of a pel.

5. The method of claim 1, wherein the observing further includes visually selecting by a user or automated selection after reading.

6. A bi-directionally scanning electrophotographic device, comprising:

a photoconductor for being impinged with a plurality of scan lines formed in alternating directions to create a latent image; and a controller for producing the latent image on the photoconductor, wherein the controller defines a first diagnostic pattern having no intentional pel mismatch and a second diagnostic pattern having intentional pel mismatch for repeatedly tiling to form the latent image as a calibration page having a plurality of bars, causing printing of the latent image on a sheet of media, observing the bars on the printed sheet of media, determining at least one of line length mismatch between alternating scan lines in which a scan line in a first scan direction has a different length than a scan line in a second scan direction, and pel differential nonlinearity between alternating scan lines in which spacing between locations of one or more pels in the first scan direction is different than spacing between locations of the one or more pels in the second scan direction, and correcting creation of future latent images on the photoconductor based upon the determining.

7. The device of claim 6, further including at least two position sensors to provide a reference position of the scan lines formed in the alternating directions.

8. The device of claim 7, wherein the sensors are located near opposite ends of the photoconductor.

9. The device of claim 7, wherein the controller repeatedly tiling comprises tiling the first and second diagnostic patterns on the same scan line for a plurality of scan lines such that the correcting is performed by the controller with a resolution of a fraction of a pel.

10. The device of claim 6, wherein the controller includes an input for receiving a selection regarding the calibration page.

11. The device of claim 6, wherein the determining comprises identifying, for a plurality of bars on the printed sheet of media, a location of at least one darker portion of the bar, the at least one darker portion being less than a length of the bar, and the correcting is based upon the identifications.

12. The device of claim 6, wherein the first diagnostic pattern defines a substantially rectangular cell of pels for at least a first and second scan line of the plurality of scan lines, the first scan line having a scan direction opposite the second scan line.

13. The device of claim 12, wherein the second diagnostic pattern defines the substantially rectangular cell of pels of the first diagnostic pattern with at least one of the pels of either the first and second scan lines being displaced at least one pel width in the scan direction.

14. The device of claim 6, wherein the calibration page includes a plurality of bars, each bar defined by repeatedly tiling together a respective one of the first and second diagnostic patterns.

15. A method of aligning printing of a hi-directionally scanning electrophotographic device, comprising:

forming a first diagnostic pattern having no intentional pel mismatch and forming a plurality of second diagnostic patterns, each second diagnostic pattern having a distinct, intentional pel mismatch amount relative to each other;

repeatedly tiling the first diagnostic pattern and second diagnostic patterns on each of a plurality of scan lines, and scanning the scan lines in first and second scan directions to define a latent image on a photoconductive member of an electrophotogaphic device, the repeated tiling and scanning thereby creating a latent calibration page having a plurality of latent bars, at least one bar having at least one scan line with more than one different diagnostic pattern;

printing a calibration page from the latent calibration page;

observing the bars in the calibration page; and based on the observation, implementing a correction for altering future scan lines in the first and second scan directions based upon the observing, the correction have a resolution of a fraction of a pel.

16. The method of claim 15, wherein each of a plurality of bars has at least one scan line having the first diagnostic pattern repeatedly tiled with one of the second diagnostic patterns on each of the at least one scan line.

17. The method of claim 15, wherein each of a plurality of bars has at least one scan line having different second diagnostic patterns repeatedly tiled on each of the at least one scan line.

18. The method of claim 15, wherein observing comprises determining at least one of line length mismatch between scan lines in the first scan direction and scan lines in the second scan direction in which a scan line in the first scan direction has a different length than a scan line in the second scan direction, and differential pel nonlinearity between the first and second scan directions in which spacing between locations of one or more pels in the first scan direction is different than spacing between locations of the one or more pels in the second scan direction.

19. The method of claim 18, wherein the determining comprises, for each of a plurality of bars on the calibration page, identifying at least one location of a darker portion of the bar, wherein a darker bar portion is less than an entire length of the bar, and wherein the correction implemented is based upon the location identifications.

* * * * *